US006889784B2

(12) United States Patent
Troll (10) Patent No.: US 6,889,784 B2
(45) Date of Patent: May 10, 2005

(54) MOTORIZED CHARIOT

(76) Inventor: Donald E. Troll, 1801 Archer Dr., Sherman, TX (US) 75092

( * ) Notice: Subject to any disclaimer, the term of this patent is extended or adjusted under 35 U.S.C. 154(b) by 29 days.

(21) Appl. No.: 10/350,888

(22) Filed: Jan. 24, 2003

(65) Prior Publication Data
US 2004/0144586 A1 Jul. 29, 2004

(51) Int. Cl.[7] .......................... B62D 51/02; B62D 53/02; B62D 61/08; B60T 1/14
(52) U.S. Cl. .......................... 180/13; 180/208; 180/213; 180/214; 180/65.5; 188/5; 280/442; 280/492
(58) Field of Search .......................... 180/13, 16, 208, 180/209, 213, 214, 211, 252, 65.5, 65.6; 280/442, 443, 492, 62; 188/5

(56) References Cited

U.S. PATENT DOCUMENTS

| 700,209 | A | | 5/1902 | Lawson |
|---|---|---|---|---|
| 1,052,829 | A | | 2/1913 | Karminski et al. |
| 2,468,801 | A | | 5/1949 | Beall |
| 2,649,162 | A | | 8/1953 | Wooldridge et al. |
| 2,674,328 | A | | 4/1954 | Searls |
| 2,701,616 | A | | 2/1955 | Cooper |
| 2,713,496 | A | | 7/1955 | Ayers |
| 2,867,449 | A | | 1/1959 | Shawver |
| 2,879,858 | A | | 3/1959 | Thomas |
| 3,183,991 | A | | 5/1965 | Garnaunt |
| 3,224,524 | A | | 12/1965 | Laher |
| 3,370,666 | A | | 2/1968 | Holtzclaw et al. |
| 3,580,349 | A | | 5/1971 | Brennan et al. |
| 3,738,440 | A | * | 6/1973 | Storm .......................... 180/13 |
| 3,927,510 | A | * | 12/1975 | Arnblock ...................... 56/12.8 |
| 4,063,608 | A | | 12/1977 | Sullivan |
| 4,300,706 | A | | 11/1981 | Hendrick et al. |
| 4,325,565 | A | * | 4/1982 | Winchell ...................... 180/210 |
| 4,503,925 | A | * | 3/1985 | Palmer et al. ................. 180/13 |
| 4,573,549 | A | | 3/1986 | Pankow |
| 4,582,157 | A | | 4/1986 | Watanabe |
| 4,625,821 | A | | 12/1986 | Aumont et al. |
| 4,629,020 | A | | 12/1986 | Thurman |
| 4,913,253 | A | | 4/1990 | Bowling |
| 4,955,451 | A | | 9/1990 | Schaefer |
| 4,998,596 | A | | 3/1991 | Miksitz |
| 5,582,501 | A | | 12/1996 | Meyer |
| 5,718,534 | A | | 2/1998 | Neuling |
| 6,003,625 | A | | 12/1999 | Neuling |
| 6,269,901 | B1 | | 8/2001 | Moffett et al. |
| 6,276,480 | B1 | | 8/2001 | Aregger |
| 6,336,600 | B1 | * | 1/2002 | Jessen .......................... 239/663 |
| 2002/0014357 | A1 | | 2/2002 | Hammonds |

* cited by examiner

Primary Examiner—Peter C. English
(74) Attorney, Agent, or Firm—Gardere Wynne Sewell LLP (57) ABSTRACT

A vehicle incorporating a power unit having a front portion, a rear portion and a power source. A drive wheel, disposed in the front of the power unit, is connected to the power source. A brake pad is connected to the power unit beneath the power source and a handle bar extends back from the power unit. The vehicle includes a trailer unit, disposed behind the power unit, having two trailer wheels, disposed on opposite sides of the trailer unit. A connecting joint, connecting the power unit to the trailer unit, allows the power unit and trailer unit to move with respect to one another about the horizontal pitch axis and/or vertical yaw axis.

25 Claims, 11 Drawing Sheets

MOTORIZED CHARIOT

FIELD OF THE INVENTION

The present invention relates generally to motorized vehicles, and more specifically to a motorized vehicle having a separate power unit and trailer unit.

BACKGROUND OF THE INVENTION

A variety of wheeled vehicles are known. Three-wheeled powered vehicles are not new. A number of designs and configurations of wheeled vehicles have been developed for use in a broad range of applications. Certain such designs have a unitary construction, while other designs have used a construction having more than one segment, wherein the multiple segments are articulated to one another through some form of joint or joints.

Although certain three-wheeled vehicles have been developed, each of the prior designs incorporates one or more limitations tending to restrict its use in certain applications. In certain designs, such vehicles are insufficiently maneuverable. In certain other designs, such vehicles are unstable and difficult to control. There remains in the field a need for a wheeled vehicle having sufficient maneuverability as well as sufficient stability.

SUMMARY OF THE INVENTION

In one embodiment, the present invention is a vehicle incorporating a power unit having a drive wheel connected to a power source, a trailer unit having at least one trailer wheel, and a connecting joint, connecting the power unit to the trailer unit, allowing the power unit and trailer unit to move with respect to one another about at least one axis.

In a second embodiment, the present invention is a vehicle incorporating a power unit having a front portion and a rear portion. A drive wheel, disposed in the front of the power unit, is connected to a power source. A handle bar extends back from the power unit for steering of the vehicle. This embodiment further includes a trailer unit, having two or more trailer wheels, disposed behind the power unit. Finally, the vehicle incorporates a connecting joint, connecting the power unit to the trailer unit, allowing the power unit and trailer unit to move with respect to one another about two axes.

In a third embodiment, the present invention is a vehicle including a power unit having a front portion, a rear portion, a power source, and a drive wheel disposed in the front portion of the power unit and connected to the power source. This embodiment incorporates a brake pad, connected to the power unit beneath the power source and a handle bar extending back from the power unit. A trailer unit is disposed behind the power unit, having two trailer wheels, disposed on opposite sides of the trailer unit. A connecting joint, connecting the power unit to the trailer unit, allows the power unit and trailer unit to move with respect to one another about the horizontal pitch axis and vertical yaw axis.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention and do not delimit the scope of the invention.

Figure 1:
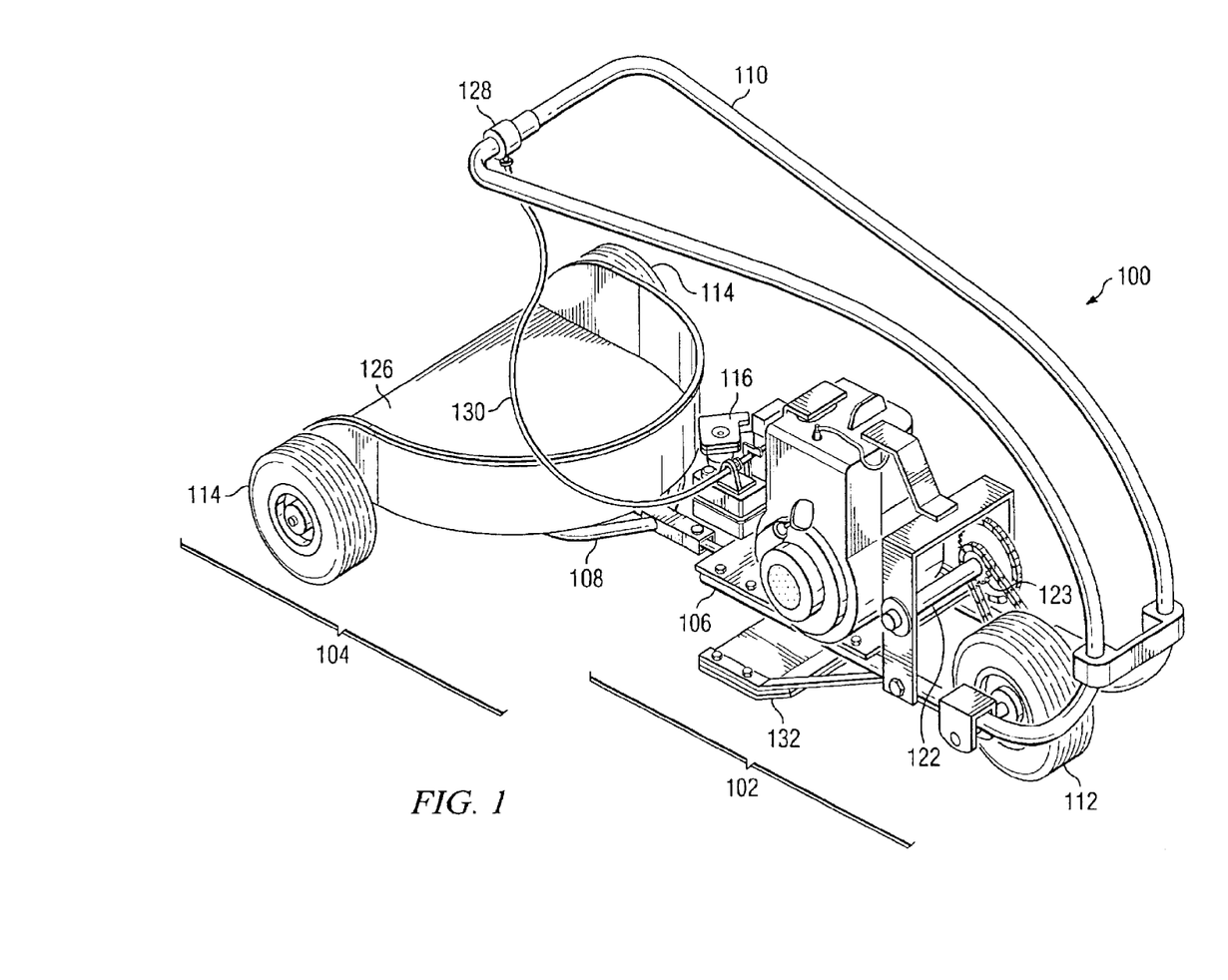
FIG. 1 is an isometric view of a motorized chariot in accordance with one embodiment of the present invention.
Figure 2:
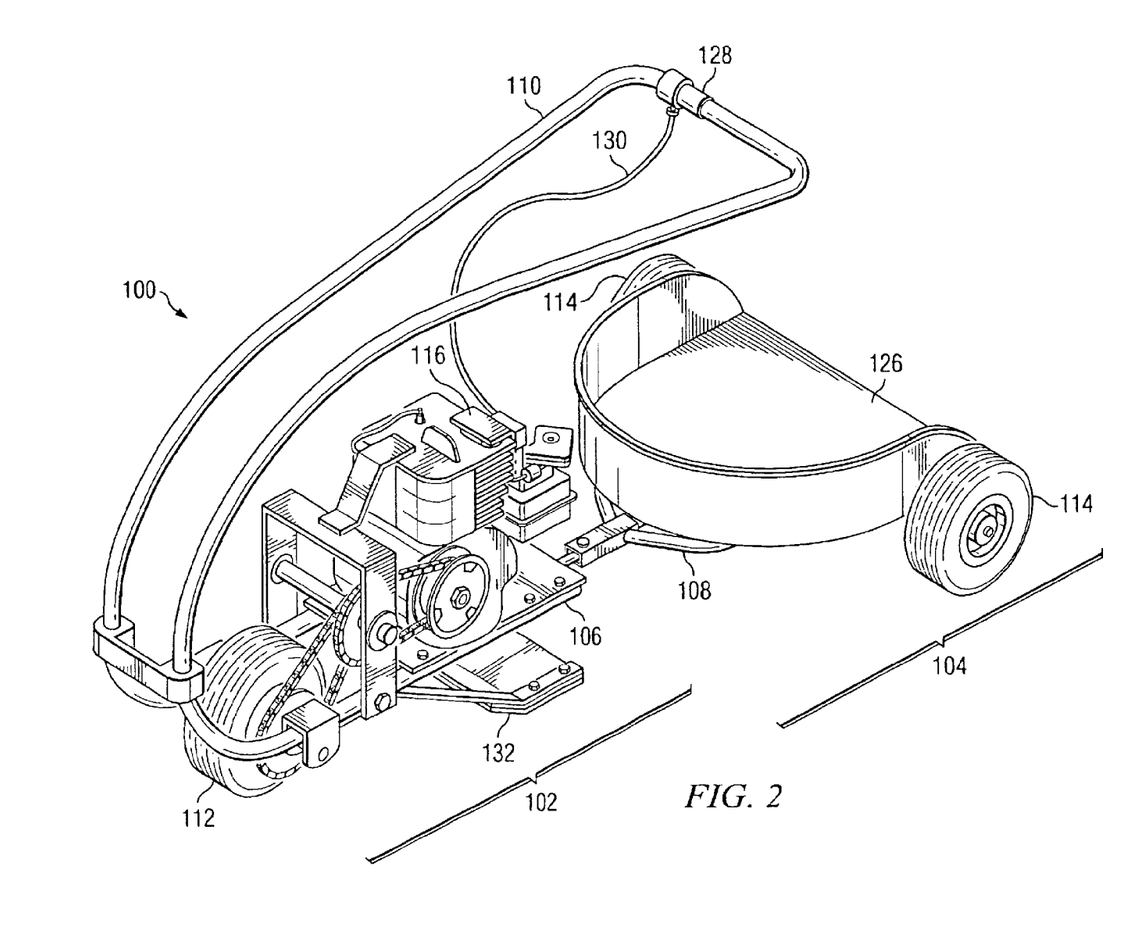
FIG. 2 is an isometric view of a motorized chariot in accordance with one embodiment of the present invention.
Figure 3:
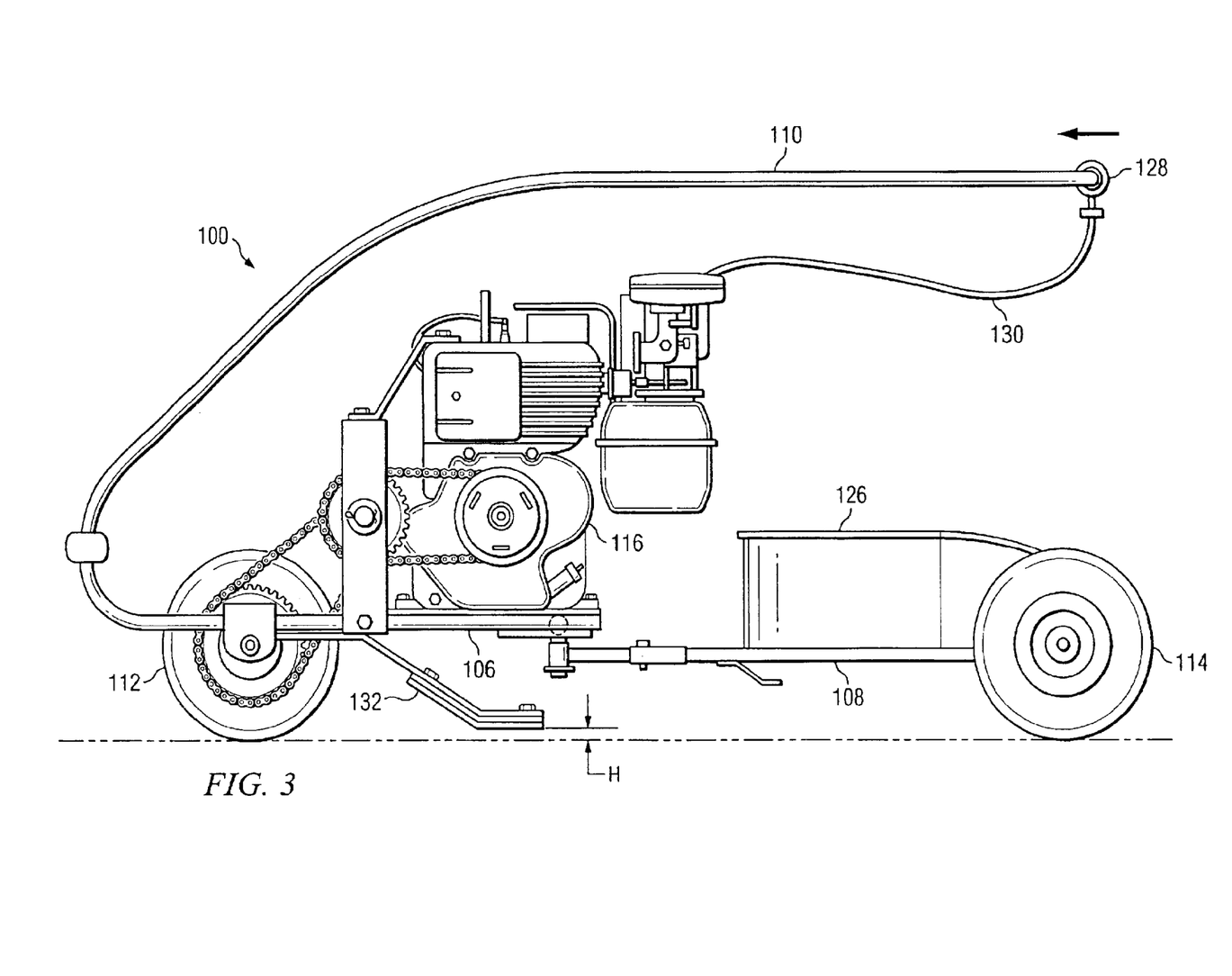
FIG. 3 is a side view of the motorized chariot of FIGS. 1 and 2.
Figure 4:
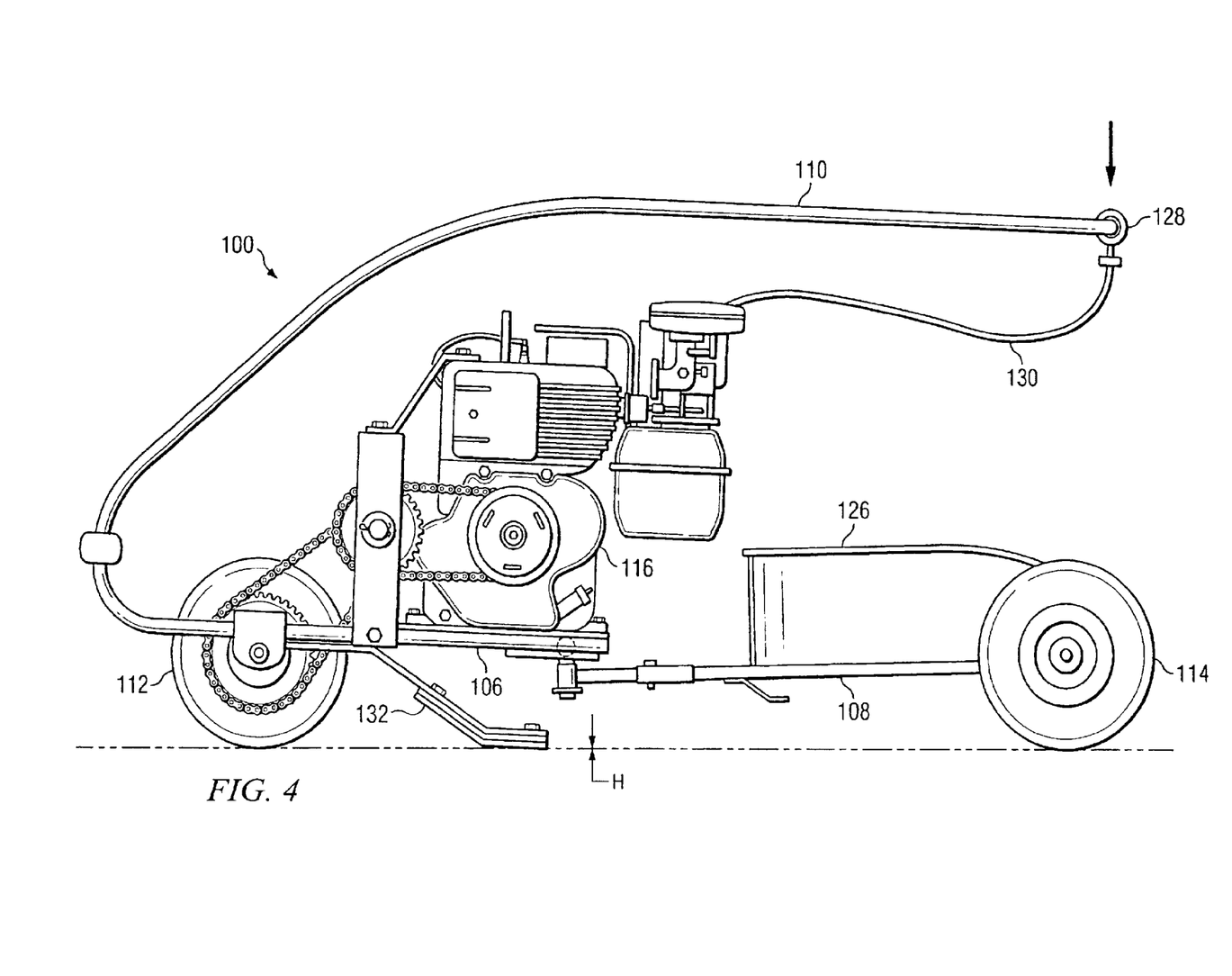
FIG. 4 is a side view of the motorized chariot of FIGS. 1 and 2.
Figure 5:
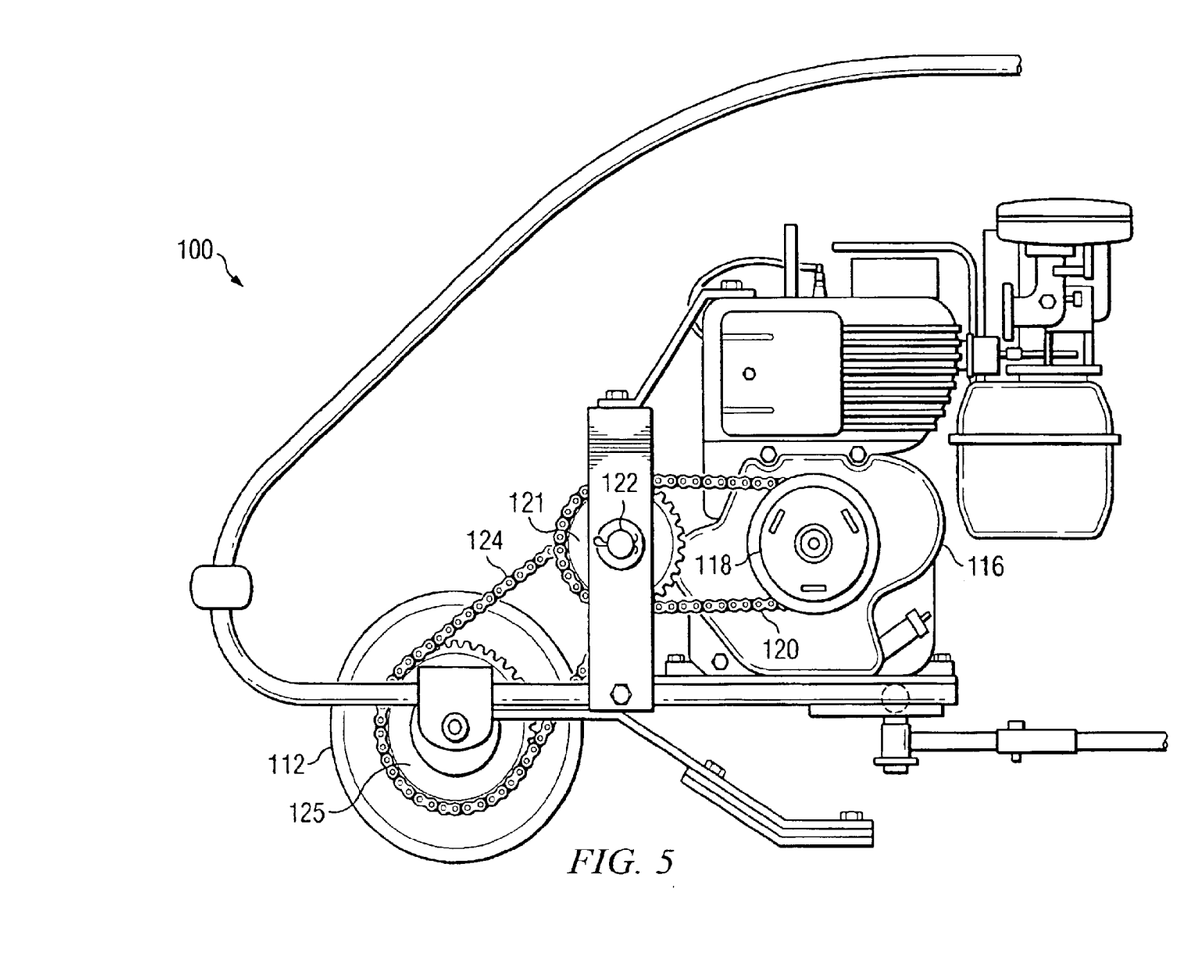
FIG. 5 is a side view of the motorized chariot of FIGS. 1 and 2.
Figure 6:
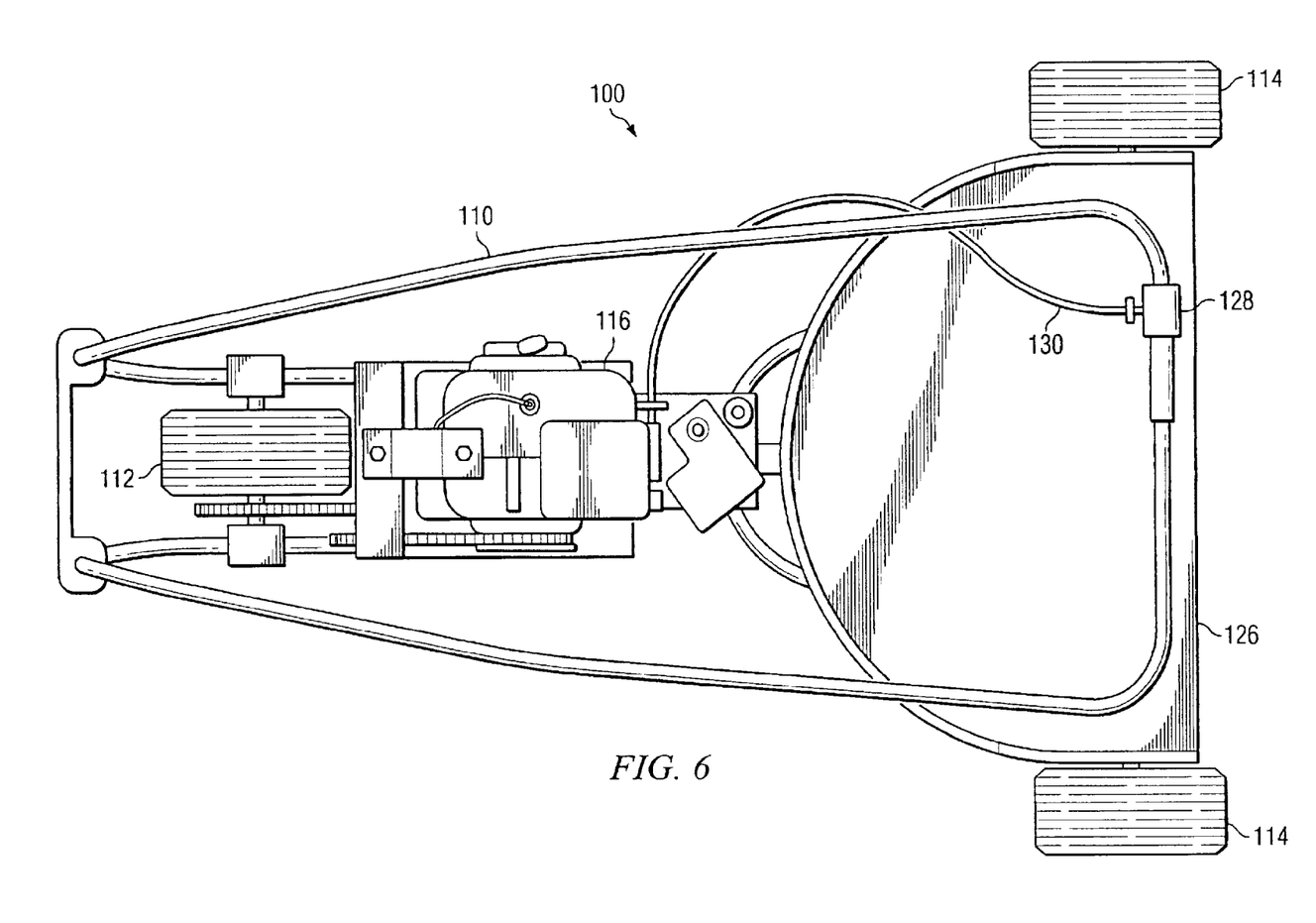
FIG. 6 is a top view of the motorized chariot of FIGS. 1–5.

FIGS. 1 and 2 are isometric views of a motorized chariot 100 in accordance with one embodiment of the present invention. FIGS. 3, 4 and 5 are side views of the motorized chariot 100 of FIGS. 1 and 2. FIG. 6 is a top view of the motorized chariot 100 of FIGS. 1–5.

As seen in FIGS. 1–6, motorized chariot 100 incorporates a power unit 102 disposed ahead of, and connected to, a trailer unit 104, so as to pull trailer unit 104. Power unit 102 and trailer unit 104 are built around a power unit frame 106 and trailer unit frame 108, respectively. The direction of travel of motorized chariot 100 is controlled by manipulation of the handle bar 110, which is directly connected to drive wheel 112 through a rigid mechanical connection. Drive wheel 112 also supports the front of the motorized chariot 100 and transmits motivating power to the ground. The rear of the motorized chariot 100 is supported by a pair of trailer wheels 114. Steering of the motorized chariot 100 is generally performed by a human user (not shown) disposed in or upon the trailer unit 104 between the trailer wheels 114.

Motivating power for the motorized chariot 100 is generated by an engine 116. The motor 116 shown in FIGS. 1 and 2 is a carbureted small-displacement single-cylinder four-stroke internal combustion engine similar to the type used on lawnmowers and other small powered equipment. Those of skill in the art will appreciate that nothing in the nature of the present invention limits its scope to this type of powerplant.

Mechanical power is transmitted out of the engine 116 to a clutch 118 disposed on the side thereof. Clutch 118 is designed to disengage and freewheel at low engine speeds, so as to allow the engine 116 to idle when the motorized chariot 100 is stationary. Clutch 118 may be a basic centrifugal clutch, or it may be a more-sophisticated variable ratio clutch of the type commonly used on snowmobiles and other small powered vehicles. Rotary mechanical power is transmitted from the clutch 118 to the primary chain 120. Primary chain 120 may, in an alternate embodiment, be replaced with a power-transmission belt.

Primary chain 120 transmits mechanical power into the jack shaft 122. Jack shaft 122 can, depending on the particular embodiment, be used as a speed reduction mechanism. Jack shaft 122 will act in this manner to increase the mechanical advantage of the engine 116 on the drive wheel 112 whenever the input sprocket 121 has a larger diameter than the output sprocket 123. With this arrangement, the linear speed of primary chain 120 will be, by necessity, higher than the linear speed of the secondary chain 124 in a ratio equal to the ratio of the diameter of the input sprocket 121 to the diameter output sprocket 123.

Power transmitted into the secondary chain 124 is then transmitted into the drive wheel sprocket 125, which is rigidly attached to the drive wheel 112. A speed reduction and torque multiplication may be designed into this portion of the power transmission mechanism as well, by providing a drive wheel sprocket 125 having a larger diameter than that of the jack shaft output sprocket 123. In this case, the rotational velocity of the drive wheel sprocket 125, and therefore the drive wheel 112, is related to the rotational velocity of the jack shaft output sprocket 123 in inverse proportion to the ratio of the diameter of the drive wheel sprocket 125 to the diameter of the jack shaft output sprocket 123.

As noted above, the motorized chariot 100 is designed to be driven by a human driver (not shown) disposed on the trailer unit 104, and specifically on the trailer platform 126, between the trailer wheels 114. From this position, a human user can steer the direction of travel of the motorized chariot 100 using the handle bar 110. A driver can control the speed of the motorized chariot 100 using the throttle control 128, which is connected to the engine 116 by throttle cable 130. In certain embodiments, throttle cable 130 may be connected directly to the butterfly valve (not shown) on the carburetor of engine 116. In alternate embodiments, the throttle cable 130 may be connected to the butterfly valve indirectly through an engine speed governor.

In addition to its guidance and steering function, handle bar 110 incorporates an additional functionality not readily apparent from a cursory viewing of the motorized chariot 100. In order for motorized chariot 100 to be steerable, the orientation of power unit 102 is variable with respect to trailer unit 104. Accordingly, the connection between power unit 102 and trailer unit 104 is pivotable about the vertical axis, as described in more detail below.

What is not readily apparent from a cursory viewing of the motorized chariot 100 is that the connection between power unit 102 and trailer unit 104 is pivotable about a horizontal axis. If the motorized chariot 100 is not supported about this horizontal pivot, it will "collapse" under its own weight. At rest, without any force acting to support the motorized chariot 100 about this connection, the motorized chariot will come to rest on the brake pad 132 rigidly attached to the anterior portion of the power unit 102.

In order to allow the motorized chariot 100 to move without dragging brake pad 132 on the ground, it is, of course, necessary to raise the brake pad 132 some distance off the ground. This is accomplished by the driver applying an upward force on the handle bar 110, and therefore a moment about the power unit 102, tending to lift the anterior portion of power unit 102, and therefore the brake pad 132, off the ground. Conversely, if the driver wishes to slow or stop the motorized chariot 100, a downward force can be applied to the handle bar 110.

A downward force on the handle bar applies a moment to the power unit 102 tending to force the anterior portion of the power unit 102 toward the ground and to lift the drive wheel 112 away from the ground. This manner of stopping can be most advantageous in the event of a stuck throttle or otherwise uncontrolled engine, in that the drive wheel 112 can be completely separated from contact with the ground. Further, this manner of stopping is advantageous in that the driver can apply the driver's full weight on the handle bar 110 in order to stop the vehicle in an emergency.

Figure 7:
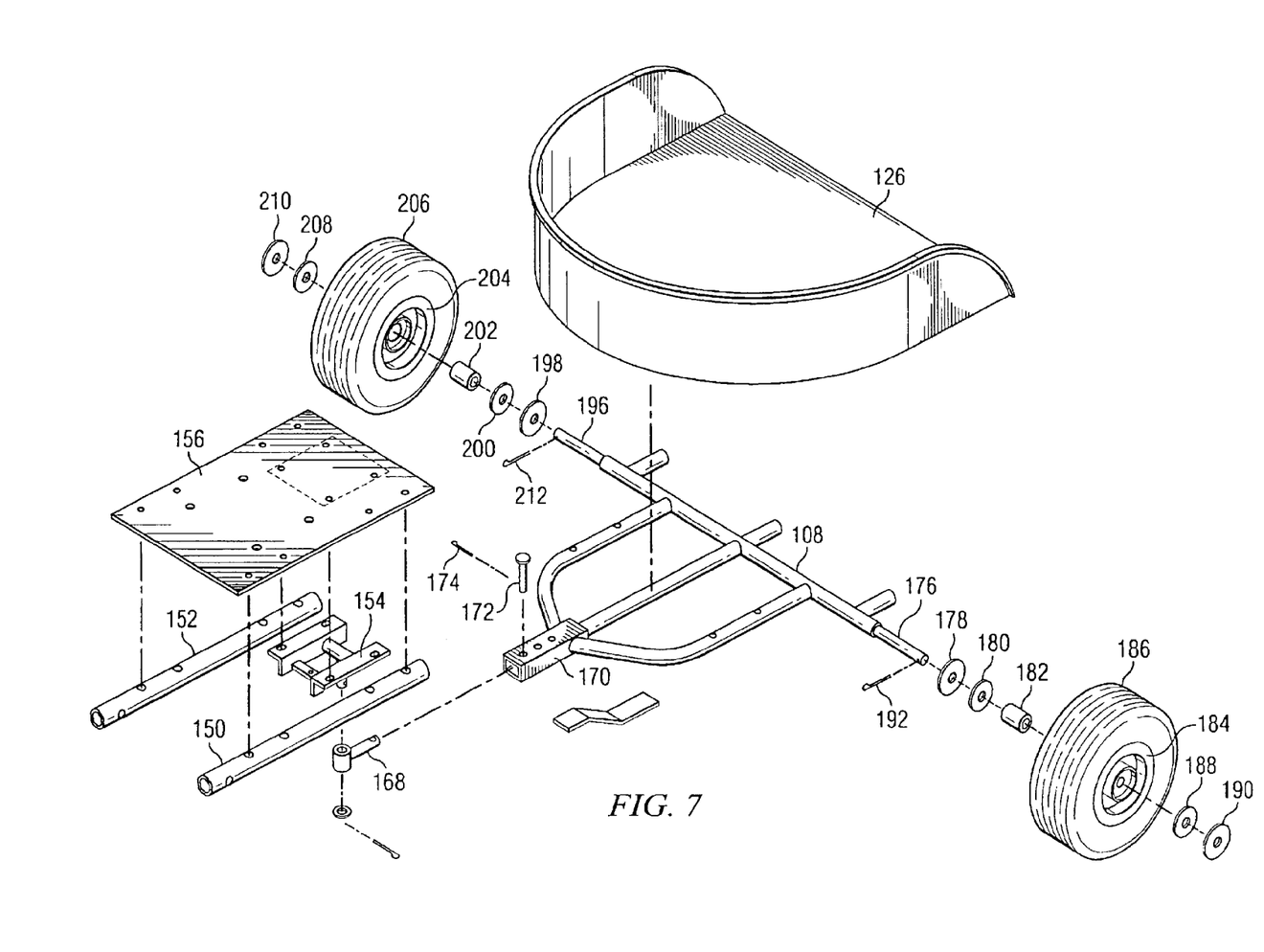
FIG. 7 depicts an exploded isometric view of the anterior portion of the power unit and the trailer unit of the motorized chariot.
Figure 8:
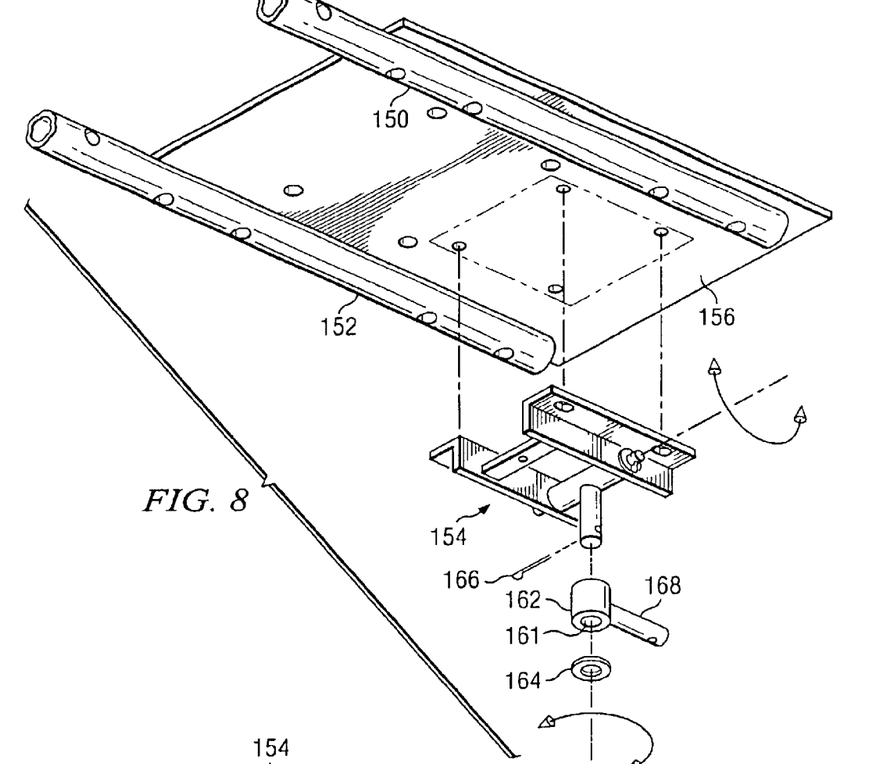
FIG. 8 depicts a detailed exploded isometric view of the connection joining the power unit to the trailer unit of the motorized chariot.
Figure 9:
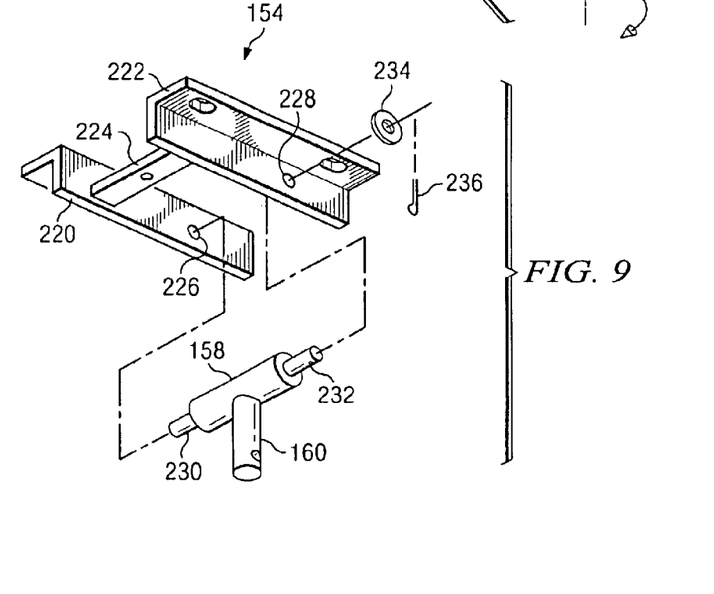
FIG. 9 depicts a second detailed exploded isometric view of the connection joining the power unit to the trailer unit of the motorized chariot.
Figure 10:
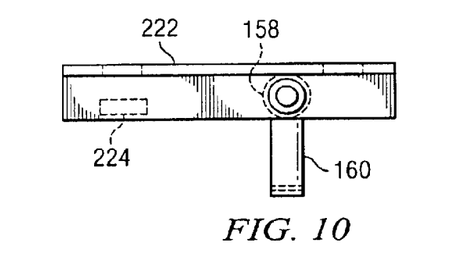
FIG. 10 is a side view of the pitch/yaw joint of FIGS. 7–9.
Figure 11:
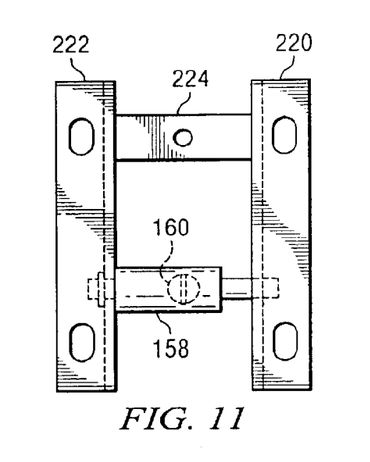
FIG. 11 is a top view of the pitch/yaw joint of FIG. 10.
Figure 12:
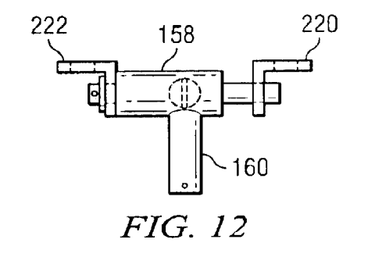
FIG. 12 is a rear view of the pitch/yaw joint of FIGS. 7–11.
Figure 13:
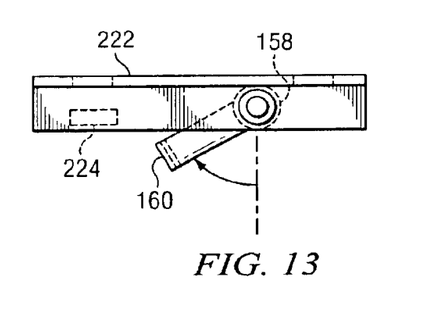
FIG. 13 is a side view of the pitch/yaw joint of FIGS. 7–12 showing the pitching of the pitch/yaw joint.
Figure 14:
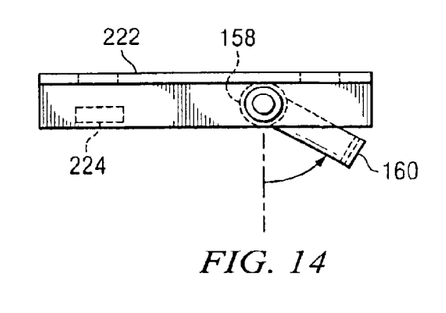
FIG. 14 is a side view of the pitch/yaw joint of FIGS. 7–12 showing the pitching of the pitch/yaw joint.

FIG. 7 depicts an exploded isometric view of the anterior portion of the power unit 102 and the trailer unit 104. FIGS. 8 and 9 depict detailed exploded isometric views of the connection joining the power unit 102 to the trailer unit 104. FIG. 10 is a side view of the pitch/yaw joint 154 of FIGS. 7–9. FIG. 11 is a top view of the pitch/yaw joint of FIG. 10. FIG. 12 is a front view of the pitch/yaw joint 154 of FIGS. 7–11. FIGS. 13 and 14 are side views of the pitch/yaw joint 154 of FIGS. 7–12 showing the pitching of the pitch/yaw joint 154.

As seen in FIG. 7, the anterior portion of power unit frame 106 incorporates a pair of frame rails 150 and 152, which are joined together at their distal ends by pitch/yaw joint 154, disposed between them, and motor plate 156, disposed above them. As seen in FIGS. 7–14, pitching motion between the power unit 102 and the trailer unit 104 is accommodated by pitch/yaw joint 154 about pitch axle 158. Similarly, yawing motion between the power unit 102 and the trailer unit 104 is accommodated by the pitch/yaw joint about yaw axle 160, disposed orthogonally to pitch axle 158.

The details of pitch/yaw joint 154 can be most clearly seen in FIGS. 8-14. Pitch/yaw joint 154 incorporates a right angle member 220, a left angle member 222, and a bracing member 224 tying right angle member 220 to left angle member 222. The right angle member 220 and left angle member 222 incorporate pitch bores 226 and 228, respectively. Pitch bores 226 and 228 accommodate and capture bearing ends 230 and 232, respectively, of pitch axle 158, thereby securing pitch axle 158 while allowing free rotation about the pitch axis. Pitch axle 158 is retained in place by a washer 234 and cotter pin 236.

As noted, yaw axle 160 is disposed orthogonally to pitch axle 158. As assembled, yaw axle 160 is disposed within a generally-cylindrical bore 161 of a generally-cylindrical yaw housing 162 and retained therein by the combination of a washer 164 and a cotter pin 166. Other retention methods will be known to those of skill in the art and may be employed without departing from the spirit and scope of the present invention.

Yaw housing 162 is rigidly connected to a tailshaft 168, which is shaped to mate with the tongue 170 of the trailer unit frame 108. Tailshaft 168 is retained within the tongue 170 by a linch pin 172, which is, in turn, retained by a cotter pin 174.

With the above-described mechanism, using the combination of a pitch axle 158 and a separate yaw axle 160 orthogonal to one another, pitching and yawing motions can be fully accommodated between the power unit 102 and trailer unit 104. At the same time, however, this mechanism does not provide for rolling motion of the trailer unit 104 with respect to the power unit 102. Although other embodiments may incorporate the ability to accommodate rolling motion between the trailer unit 104 and power unit 102, it is believed that prevention of rolling motion may provide certain advantages in the form of better control of the motorized chariot 100.

Disposed at the outer ends of the trailer unit frame 108 are a pair of axles 176 and 196. On the interior sides of the axles 176 and 196 are a pair of thrust washers 178 and 198. Adjacent to thrust washers 178 and 198 axe a pair of thrust bushings 180 and 200, and radial bearings 182 and 202. Riding on bearings 182 and 202 are a pair of hubs 184 and 204, upon which are disposed tires 186 and 206. Securing hubs 184 and 204 on the outside are thrust bushings 188 and 208, thrust washers 190 and 210, and cotter pins 192 and 212.

Figure 15:
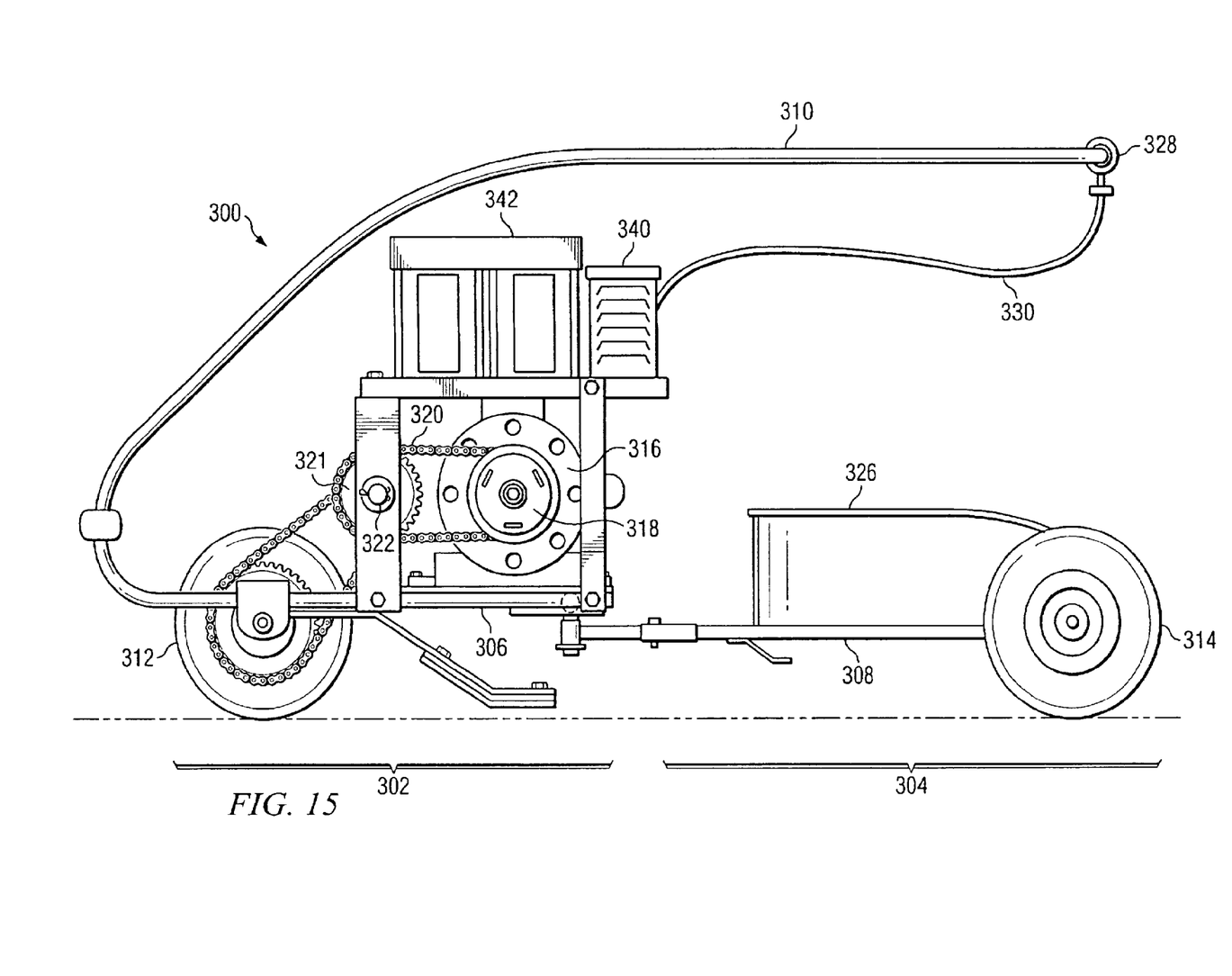
FIG. 15 is a side view of a motorized chariot employing an electric motor for a mechanical power source.
Figure 16:
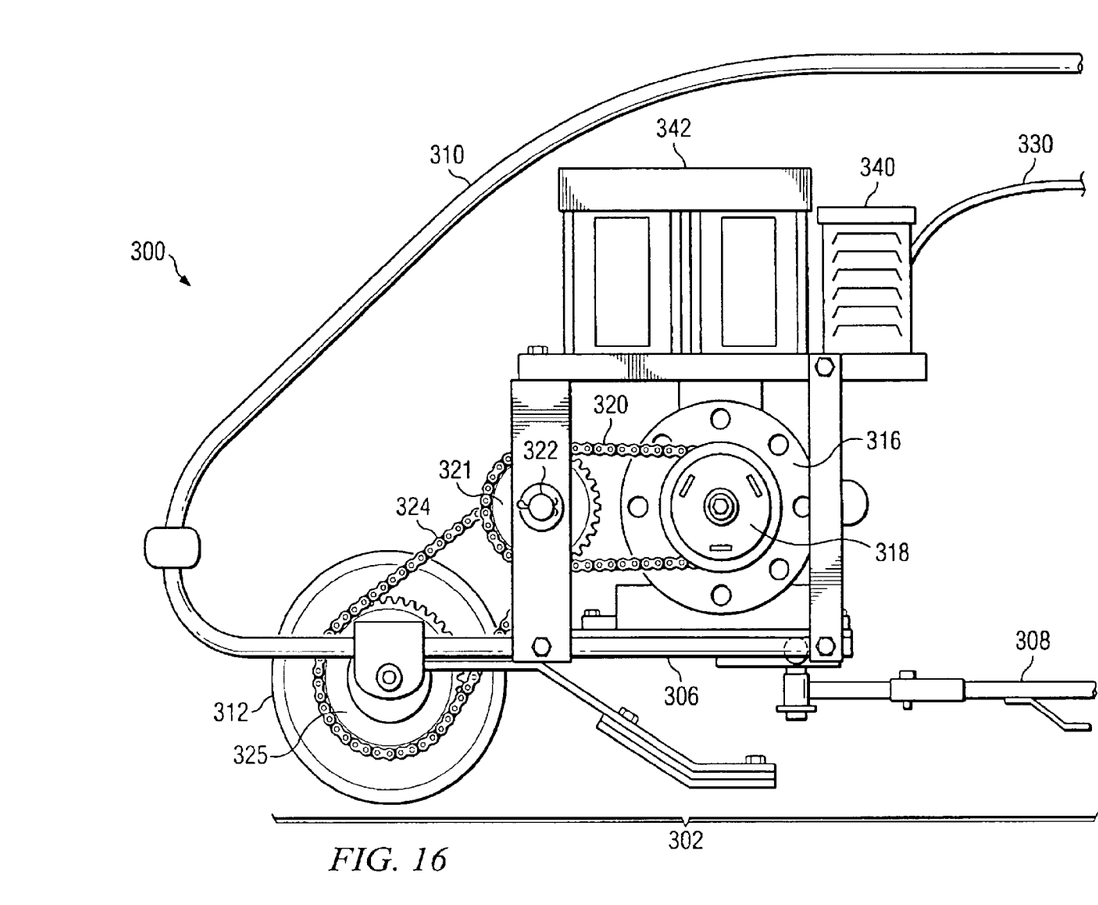
FIG. 16 is a detailed side view of the motorized chariot of FIG. 15.

FIGS. 15 and 16 are side views of a motorized chariot 300 in accordance with a second embodiment of the present invention. As seen in FIGS. 15 and 16, motorized chariot 300 incorporates a power unit 302 disposed ahead of, and connected to, a trailer unit 304, so as to pull trailer unit 304. Power unit 302 and trailer unit 304 are built around a power unit frame 306 and trailer unit frame 308, respectively. The direction of travel of motorized chariot 300 is controlled by manipulation of the handle bar 310, which is directly connected to drive wheel 312 through a rigid mechanical connection. Drive wheel 312 also supports the front of the motorized chariot 300 and transmits motivating power to the ground. The rear of the motorized chariot 300 is supported by a pair of trailer wheels 314. Steering of the motorized chariot 300 is generally performed by a human user (not shown) disposed in or upon the trailer unit 304 between the trailer wheels 314.

Motivating power for the motorized chariot 300 is generated by an electric motor 316. The motor 316 shown in FIGS. 15 and 16 may be, for example, a, direct current motor, a brushless motor, a stepper motor, an alternating current motor. Those of skill in the art will appreciate that nothing in the nature of the present invention necessarily limits its scope to these specific types of electric motor.

Mechanical power is transmitted out of the electric motor 316 to a flywheel 318 disposed on the side thereof. Rotary mechanical power is transmitted from the flywheel 318 to the primary chain 320. Primary chain 320 may, in an alternate embodiment, be replaced with a power-transmission belt.

Primary chain 320 transmits mechanical power into the jack shaft 322. Jack shaft 322 can, depending on the particular embodiment, be used as a speed reduction mechanism. Jack shaft 322 will act in this manner to increase the mechanical advantage of the engine 316 on the drive wheel 312 whenever the input sprocket 321 has a larger diameter than the output sprocket (not shown). With this arrangement, the linear speed of primary chain 320 will be, by necessity, higher than the linear speed of the secondary chain 324 in a ratio equal to the ratio of the diameter of the input sprocket 321 to the, diameter of the output sprocket.

Power transmitted into the secondary chain 324 is then transmitted into the drive wheel sprocket 325, which is rigidly attached to the drive wheel 312. A speed reduction and torque multiplication may be designed into this portion of the power transmission mechanism as well, by providing a drive wheel sprocket 325 having a larger diameter than that of the jack shaft output sprocket. In this case, the rotational velocity of the drive wheel sprocket, and therefore the drive wheel 312, is related to the rotational velocity of the jack shaft output sprocket in inverse proportion to the ratio of the diameter of the drive wheel sprocket 325 to the diameter of the jack shaft output sprocket.

As noted above, the motorized chariot 300 is designed to be driven by a human driver (not shown) disposed on the trailer unit 304, and specifically on the trailer platform 326, between the trailer wheels 314. From this position, a human user can steer the direction of travel of the motorized chariot 300 using the handle bar 310. A driver can control the speed of the motorized chariot 300 using the motor speed control 328, which is connected to the motor 316 by control cable 330.

In the embodiment shown in FIGS. 15 and 16, motor 316 receives electric power from a motor control module 340, which regulates the flow of electricity from batteries 342 to electric motor 316. Depending on the application, motor control module 340 may regulate the voltage to the motor 316, the current to the motor 316, or both. Motor 316 may incorporate a torque or speed feedback mechanism to the user, to the motor control module 340, or both. Feedback to the motor control module 340 enables the power unit 302 to function as a servo, and thereby able to maintain a constant vehicle speed under a variety of conditions.

In order for motorized chariot 300 to be steerable, the orientation of power unit 302 is variable with respect to trailer unit 304. Accordingly, the connection between power unit 302 and trailer unit 304 pivotable about the vertical axis, as described above.

Although preferred embodiments of the invention have been described in detail, it will be understood by those skilled in the art that various modifications can be made therein without departing from the spirit and scope of the invention as set forth in the appended claims.

What is claimed is:

1. A vehicle comprising:
   a power unit having a drive wheel connected to a power source and a ground-engaging brake pad connected to the power unit beneath the power source and behind the drive wheel;
   a trailer unit having at least one trailer wheel; and
   a connecting joint, connecting the power unit to the trailer unit, allowing the power unit and trailer unit to move with respect to one another about at least one axis to allow the ground-engaging brake pad to engage the ground and be lifted off of the ground.

2. The vehicle of claim 1 wherein the power source is an internal combustion engine.

3. The vehicle of claim 1 wherein the power source is an electric motor.

4. The vehicle of claim 1 wherein the at least one axis is a substantially vertical yaw axis.

5. The vehicle of claim 1 wherein the at least one axis is substantially horizontal.

6. The vehicle of claim 1 wherein the power source is connected to the drive wheel through a flexible power-transmission element.

7. The vehicle of claim 1, wherein the ground-engaging brake pad is rigidly attached to an anterior portion of the power unit.

8. A vehicle comprising:
- a power unit having a front portion, a rear portion, a power source, a drive wheel, disposed in the front portion of the power unit and connected to the power source, and a handle bar extending back from the power unit;
- a trailer unit, having two or more trailer wheels, disposed behind the power unit; and
- a pitch/yaw joint to allow pitch and yaw motion of the power unit with respect to the trailer unit comprising spaced-apart members mounted on the power unit, and a member defining a yaw axle and a pitch axle, the pitch axle being operably connected to the spaced-apart members mounted on the power unit and allowing the power unit and trailer unit to move with respect to one another about two axes.

9. The vehicle of claim 8 wherein the power source is an internal combustion engine.

10. The vehicle of claim 8 wherein the power source is an electric motor.

11. The vehicle of claim 8 wherein at least one of the two axes is a substantially vertical yaw axis.

12. The vehicle of claim 8 wherein at least one of the two axes is substantially horizontal.

13. The vehicle of claim 8 wherein the power source is connected to the drive wheel through a flexible power-transmission element.

14. The vehicle of claim 8 wherein the power unit is supported on a single wheel.

15. The vehicle of claim 8 wherein the yaw axle is operably connected to a yaw housing connected to the trailer unit.

16. The vehicle of claim 15 wherein the yaw housing is connected to a tongue of the trailer unit.

17. The vehicle of claim 16 wherein the yaw housing includes a tail shaft operable to be connected to the tongue in a selected working position.

18. The vehicle of claim 16 wherein the connection between the yaw housing and the tongue includes a pin to prevent rolling motion of the trailer unit relative to the power unit.

19. A vehicle comprising:
- a power unit having a front portion, a rear portion, a power source, a drive wheel disposed in the front portion of the power unit and connected to the power source, a ground-engaging brake pad connected to the power unit beneath the power source and behind the drive wheel and a handle bar extending back from the power unit;
- a trailer unit, disposed behind the power unit, having two trailer wheels, disposed on opposite sides of the trailer unit; and
- a connecting joint, connecting the power unit to the trailer unit, allowing the power unit and trailer unit to move with respect to one another about a horizontal pitch axis and a vertical yaw axis to allow the ground-engaging brake pad to engage the ground and be lifted off of the ground.

20. The vehicle of claim 19 wherein the power source is an internal combustion engine.

21. The vehicle of claim 19 wherein the power source is an electric motor.

22. The vehicle of claim 21 wherein the electric motor is a direct current motor.

23. The vehicle of claim 21 wherein the power unit further comprises a battery and a control module connecting the battery to the electric motor.

24. The vehicle of claim 23 wherein the control module modulates the voltage to the electric motor.

25. The vehicle of claim 19 wherein the ground-engaging brake pad is rigidly attached to the front portion of the power unit.

* * * * *